Jan. 11, 1966 T. A. DALY ET AL 3,228,370
ELECTRICAL CONTROL SYSTEMS
Filed Jan. 28, 1950 3 Sheets-Sheet 1

INVENTORS
Thomas A. Daly and
Stephen Kowalyshyn, Jr.
BY
Paul E. Friedemann
ATTORNEY

Fig. 2.

United States Patent Office 3,228,370
Patented Jan. 11, 1966

3,228,370
ELECTRICAL CONTROL SYSTEMS
Thomas A. Daly and Stephen Kowalyshyn, Jr., Sharon, Pa., assignors, by mesne assignments, to the United States of America as represented by the Secretary of the Navy
Original application May 14, 1947, Ser. No. 748,078. Divided and this application Jan. 28, 1950, Ser. No. 141,146
3 Claims. (Cl. 114—20)

This application is a division of copending application Serial No. 748,078, filed May 14, 1947, now Patent No. 3,053,217.

This invention relates, generally, to electrically operated and controlled conveyances, and more particularly, to homing torpedoes of the type having electrical propulsion and control equipment, and in certain of its aspects, is related to a copending application of T. A. Daly and S. Kowalyshyn, Jr., Serial No. 699,042, filed on September 24, 1946, entitled Electrical Control Systems, now abandoned, and to the copending application of H. L. Prescott and S. Bennon, Serial No. 761,480, filed July 17, 1947, entitled Electrical Control Systems, now abandoned, each application being assigned to the same assignee.

It has been recognized for some time that torpedoes in which compressed gases are utilized as the energy source, either to drive turbines connected to the propulsion screws or to be exhausted as a jet, are undesirable for war shot purposes since the torpedo wake caused by the exhausted gas reveals the approximate location of the submarine from which the torpedo was fired as well as the course of the torpedo. Efforts directed to producing a torpedo leaving no wake have resulted in the development of torpedoes powered by electric motors. This, of course, required the inclusion of a source of electric energy suitable for adequately supplying the electric motor for the duration of the torpedo's run and this has been found readily possible. Usually the source of energy is in the form of a primary or secondary battery.

With electric power in this form now available in the torpedo for propulsion, the problem of supplying electrical power for equipment providing control of the torpedo's movement is minimized, making the all-electric acoustic-homing torpedo a feasible and practical weapon. Accordingly, considerable development effort in the accomplishment of this end has been expended.

Initially, torpedo equipment included little more than depth and directional control devices for the torpedo which maintained a selected course and depth of operation once the torpedo was launched. In one control arrangement, a gyroscope which controlled solenoids actuating directional rudders and a pressure and longitudinal tilt responsive apparatus controlling solenoids actuating depth rudders or elevators were utilized as the movement controlling elements.

Later refinements of this equipment permitted launching of the torpedo in any predetermined direction by simple presetting of the gyroscope control, the control being such as to cause the torpedo to traverse a predetermined arc and then head toward the intended target.

While such electrical control systems for torpedoes offered measurable improvements over prior art schemes, both in respect to accuracy of control function and reliability, electro-acoustic target-detection equipment offered yet more desirable performances in the form of a control providing what may be generally termed automatic tracking of the target by the torpedo.

There are, of course, a number of ways in which electro-acoustic and electrical equipment may be utilized to detect and effect tracking of a target, but a simple yet effective scheme includes the use of piezo electric crystal or magnetostriction generators which will produce voltages depending upon the impinging noise level, such noise or vibration level being caused, for example, by the propulsion screws and/or machinery noises of conveyances operating in the fluid medium. By properly utilizing the crystal or magnetostriction hydrophones as the control elements in electrical systems affording control, for example, of a torpedo in horizontal and vertical control planes, the torpedo can be made to follow a path tending always to terminate at the vibration or signal source constituting the target.

As in the case of the above-mentioned copending applications, the present apparatus provides torpedo action wherein, during a preset interval of time, the torpedo is controlled directionally by means of a gyroscope and its depth is regulated at a preset level, say of the order of 80 feet, by means of a hydrostat and a pendulum which respectively control the actions of steering and depth rudders. After the expiration of the said interval of time, suitable controls are initiated to provide for switching over the steering and depth control of the torpedo to the electro-acoustic control, the switch over of the control depending in general upon the magnitude and duration of the signal being picked up by the acoustic system.

Proper acoustic control, however, has been found to be critically dependent upon constancy of characteristics of the energizing electrical power source, at least with respect to the electronic tube circuits, particularly when they are supplied from the same source which drives the propulsion motors, and especially when the source and motor system is selectively arranged to provide torpedo operation at various speeds.

In the use of torpedoes against various types of vessels, it has been found desirable to provide more than a single speed of operation. In general, the acoustic type of torpedo, herein disclosed, displays less tendency to track its own signal when it is operated at low speeds and its own noise level is low. Such a low speed of operation of course is not desirable against fast moving ships since the torpedo speed would be too low to overtake the ship being tracked. However, against slower moving craft such as freighters, the slow speed of operation has been found adequate. Additionally, by proper use of the batteries in the torpedo it is possible to increase the effective range thereof and the torpedo may therefore be launched from greater distances, and the launching submarine or vessel is less liable to be detected.

It is, therefore, a specific object of this invention to provide a system of batteries for supplying electric energy to the propulsion motors of the torpedo in which means is had for connecting the batteries either in series or in parallel circuit relation to provide two predetermined speeds of operation of the torpedo.

It has been found, however, that in providing multi-speed operation in this manner, terminal voltage characteristics of the electrical power source change to an extent great enough to adversely affect associated electrical control equipment, particularly the filament or heater circuits of the electronic tubes therein, supplied from the same source.

It is therefore another specific object of this invention to provide a system of automatically normalizing the current which is supplied to auxiliary utilization circuits from a multi-section electrical power source which is subject to selectively adjustable power delivery to a major utilization circuit.

The foregoing statements are merely illustrative of the various aims and objects of this invention. Other objects and advantages will become apparent upon a study of the following specification when considered in conjunction with the accompanying drawings, in which.

It may first be noted, at this point, that in the following description of a particular torpedo in which the present invention is embodied in association with suitable relay circuitry, which is given for the purpose of full and complete disclosure, an immediate general understanding of the present invention may be obtained by reference to descriptions given under the headings "Control Circuit Elements" (particularly item 1 thereunder), "Propulsion Motor System," and "Electro-Acoustic Circuit Energization."

*General torpedo operation*

With the torpedo of this invention, the torpedo may be fired at points from the target approaching the torpedo's maximum range and set to follow a course having any desired angular relation with the path of the launching craft within preset limits which will hereinafter be defined. Thus the torpedo may be fired from safe ranges and caused to pursue a path directed (in azimuth) toward the target (surface craft), and, when an acoustic signal of the target of sufficient magnitude is received, the torpedo is automatically directed along a path tending always to terminate at the target.

Figure 1:
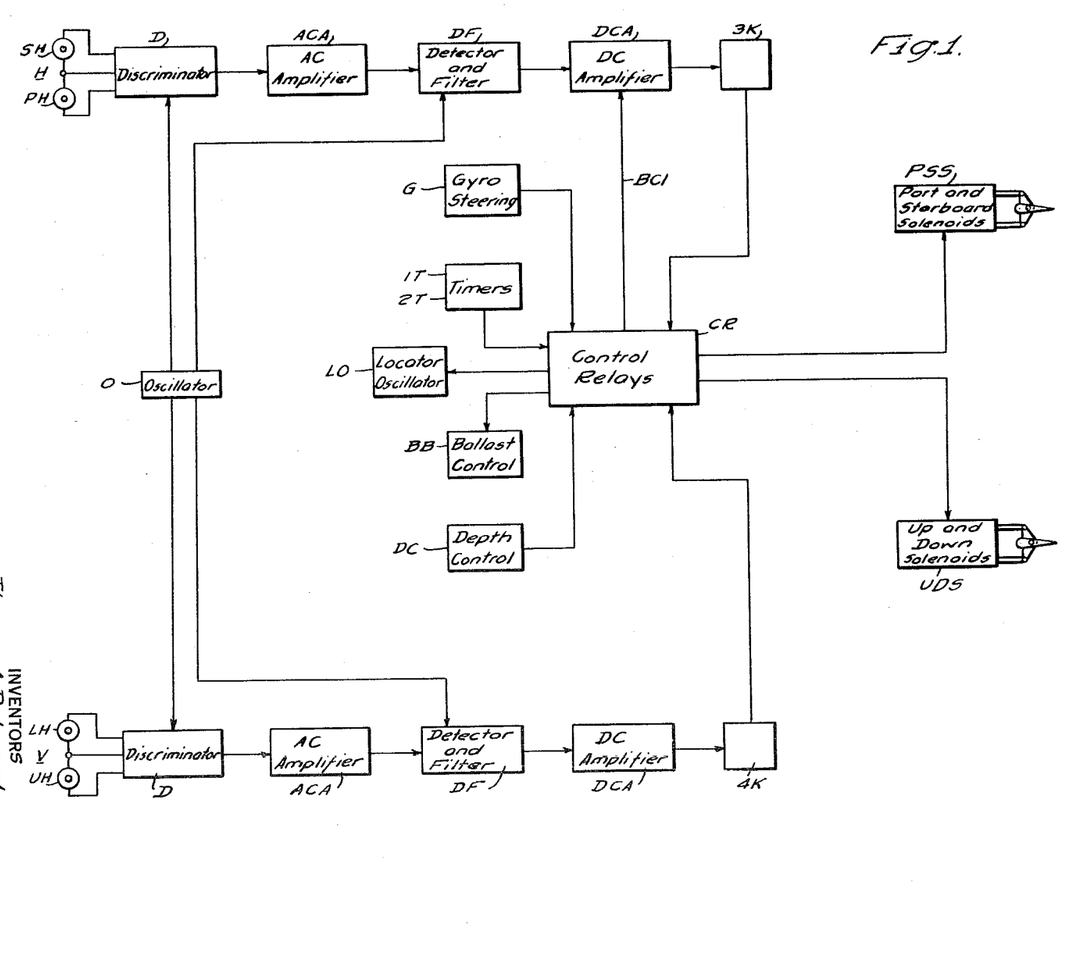
FIGURE 1 is a block diagram illustrating the general combination of major components which provide torpedo control and homing functions.

The block diagram of FIG. 1 illustrates the general control arrangement of the torpedo. The control provides two distinct types of directional and depth control for the torpedo. The first is the type which directs the torpedo along a predetermined course at a predetermined depth, and this control is initiated by the gyroscope steering mechanism generally designated G and by the depth control unit designated DC. The second type of control involves the acoustic gear which is arranged to respond to vibrations of the fluid medium.

The horizontal acoustic channel H includes the starboard and port hydrophones SH and PH, respectively. These hydrophones are connected with a discriminator D, which in turn is connected with an alternating-current amplifier which amplifies the output of the discriminator. The output of the amplifier ACA is supplied to a detector and filter circuit, designated DF, which in turn controls the direct-current amplifier DCA. Direct-current amplifier DCA controls a relay 3K and the relay 3K through suitable control relays, designated CR, operates the port and starboard solenoids, designated PSS, to obtain steering in the proper direction.

In the vertical channel V of the acoustic gear, a single set of hydrophones, designated UH and LH for upper hydrophone and lower hydrophone, respectively, are provided to control the output of the vertical channel. Like the horizontal channel, the vertical channel also includes the discriminator D, the A.C. amplifier ACA, the detector and filter circuit DF, a D.-C. amplifier DCA, and a relay 4K which is controlled by the output of the direct-current amplifier of the vertical acoustic channel. Relay 4K through certain of the control relays of the control relay unit CR and in conjunction with the depth control DC operates the up and down solenoids UDS, after enabling, to control the depth of operation of the torpedo.

The discriminators and the detector and filter circuits of both the horizontal and vertical acoustic channels are controlled by an oscillator O. This oscillator is so arranged that its signal synchronizes the operation of the discriminator and the detector and filter which are associated in the respective channels so that signals from the associated pair of hydrophones are alternately applied from the discriminator through the A.-C. amplifier into the detector and filter circuit, where the signals are compared as to magnitude and their differential applied to the grid circuits of the D.-C. amplifier.

More in particular, the discriminator in each channel is equipped with a pair of tubes which are connected in parallel. These tubes are provided with a predetermined bias upon their grid circuits. The oscillator signal is so connected with each of the grids of the parallel connected tubes that its signal first sweeps the grid of one of the parallel tubes over its conducting range and then on the other half cycle of the oscillator its signal sweeps the grid of the other of the parallel connected tubes over its conducting range.

The hydrophones each form a part of resonant circuits which are respectively connected with the grids of the parallel connected tubes. The frequency of these resonant circuits is well above that of the oscillator signal and the output circuit of the parallel connected tubes contains a resonant circuit which is tuned to the same frequency. Thus during periods when there is no hydrophone signal on the grids of the parallel connected tubes of the discriminator, the oscillator sweep voltage causes no output of the discriminator tubes. However, upon the occurrence of a signal from the two hydrophones on the grids of the discriminator tubes, the output circuit of the tubes which is tuned to the resonant frequency of the hydrophone circuits passes the alternate spurts of energy from the discriminator tubes as controlled by the oscillator sweep voltage or signal. The input circuit of the A.-C. amplifier is tuned to the resonant frequency of the hydrophone signal and, as a consequence, this signal is passed through and amplified in the A.-C. amplifier to the detector and filter circuit.

The detector and filter circuit DF includes a pair of diodes, and the cathodes of these diodes are relatively positive with respect to the plates thereof. As a consequence, these diodes will not conduct until the cathode biases are overcome. As previously mentioned, the oscillator signal is applied to the detector and filter circuit in a manner to synchronize its function with that of the discriminator. In accomplishing this, the oscillator signal or sweep voltage is so applied to the diodes of the detector and filter circuit that the diode associated with one of the parallel connected tubes of the discriminator circuit has applied thereto a voltage just slightly smaller than the voltage required for this tube to become conducting and this voltage is applied at the same instant as the corresponding tube in the discriminator circuit is enabled by the oscillator and passing the associated hydrophone signal. During the next half-cycle, the other diode is synchronized to be enabled by the oscillator sweep voltage with the enabling of the other tube of the discriminator circuit. Thus in effect, the oscillator switches the A.-C. amplifier back and forth between the corresponding tubes of the discriminator and the detector and filter so that the spurts of hydrophone signal passing through the system are amplified by the diodes functioning as detectors in the system and passed to the filter or differential network. The signals are compared in the differential network and, as previously explained, the differential signal is applied to the direct-current amplifier which through the relay 3K controls the port and the starboard solenoids.

While the above description has been confined to the horizontal channel, it will be understood that the vertical channel functions in a similar manner.

The foregoing description concerning the acoustic gear has been of a general nature, further details thereof will be disclosed and described in connection with the detailed description concerning FIG. 2. This functional description is presented at this time so that the details which follow may be more readily appreciated and understood.

In the operation of the torpedo for exercise shots or test purposes, means are provided for recovering the torpedo at the end of the trial run. Stop circuits for accomplishing this are initiated through the timers of the single block designated 1T and 2T. In the actual embodiment, the timer 1T is utilized in the test torpedo to initiate, at the time of launching of the torpedo, control circuits through normally closed contacts and, after the time interval set by the timer has elapsed, these circuits are interrupted to deenergize the torpedo's propulsion and control systems in conjunction with the function of the control relays. Additionally, circuits are initiated through the closure of normally opened contacts of the timer 1T to initiate operation of the ballast control designated BB through the control relays. At the same time, through the control relays the locator oscillator LO is set into operation. This oscillator excites a small diaphragm (not shown) in the hull of the torpedo to cause vibration thereof in the fluid medium, producing a signal which may be located with suitable direction finding equipment and thus facilitating the location and recovery of the torpedo.

The ballast control of the torpedo exhausts the liquid ballast which is initially included for the purpose of making the torpedo negatively buoyant to simulate the war shot torpedo. When the liquid ballast is exhausted, the torpedo becomes positively buoyant and thus rises to the surface where it may be easily recovered and towed back to the starting point in preparation for additional tests and inspection.

The timer 2T forming a part of the control system is utilized to control the enabling distance of the torpedo. This timer may be varied over any range setting up to the maximum range of the torpedo and functions through the control relays to provide acoustic enabling of the torpedo at the selected range.

The foregoing discussion covers the control of the torpedo afforded by the acoustic gear in both the horizontal and vertical control planes, and the gyro control devices in the horizontal plane and depth control in the vertical control plane. The operating sequence of these two controls is established by the timer 2T, which through the medium of the control relays to be hereinafter described in detail connects the gyro G along with its companion depth control DC to the respective groups of rudder solenoids. After a certain timed interval determined by the setting of the timer 2T, circuits are established by this timer to enable transfer of the control to the acoustic gear, but only if the acoustic signals are sufficiently strong to properly control the torpedo. Should the strength of the acoustic signals be of insufficient magnitude or of insufficient duration to effect complete transfer to the acoustic system, the torpedo will proceed according to the predetermined control pattern but, in this instance, in the horizontal control plane, the gyroscope, instead of working directly through the control relays to the port and starboard solenoids of the directional rudders, now applies a control to the detector-filter circuit to cause the operation of the relay 3K in response to the gyroscope steering control. The relay 3K operating through the control relays now controls the port and starboard solenoids. This biasing control on the detector and filter circuit does not unblock the two diode tubes of the detector circuit, but the control, as will be hereinafter explained, is effectively applied to the differential network thereof previously mentioned and results in an unbalance thereof in a direction depending upon the point in the differential circuit to which the bias is applied. The D.-C. amplifier, which is responsive to the output of the differential network thereof, is directly affected by the biasing potentials of the gyroscope and the amplifier responds accordingly.

While the torpedo is operating under the influence of the biasing control afforded by the gyroscope, should a sound field be encountered, the intensity of the sound field must be sufficient to overcome the effect of the bias on the differential network which is applied by the gyroscope. When this effect is overcome, the torpedo immediately follows the course indicated by the acoustic gear. This course tends to take the torpedo toward the signal source. As the longitudinal axis of the torpedo points toward the signal source, the signal differential of the starboard and port hydrophones drops to a level below that of the biasing effect of the gyroscope on the differential network and, as a consequence, the torpedo is controlled by the gyroscope. This function continues until the signal differential in the vertical channel between the upper and lower hydrophones reaches a predetermined level which is higher than that required to acoustically steer the torpedo in the horizontal plane. When the differential signal of the vertical acoustic channel is of sufficient magnitude for a sufficient interval of time, the relay 4K, in response thereto, initiates circuits through the control relays providing a complete switch over to acoustic control. In the horizontal channel, the relay 3K now operates, to the exclusion of the gyro steering mechanism G, to control the port and starboard solenoids. In the vertical channel, the relay 4K, in response to the vertical acoustic signal, alternately energizes and deenergizes the depth control DC. In its deenergized condition, the depth control DC applies up rudder to the torpedo tending to cause the torpedo to come to the surface. In its energized position, the depth control tends to keep the torpedo at the depth for which it was originally set. In this capacity, when the vertical channel signal is sufficiently strong the relay 4K functions to deenergize the depth control. Thus the torpedo tends to rise to attack the target.

*Electro-acoustic circuits*

Figure 2:
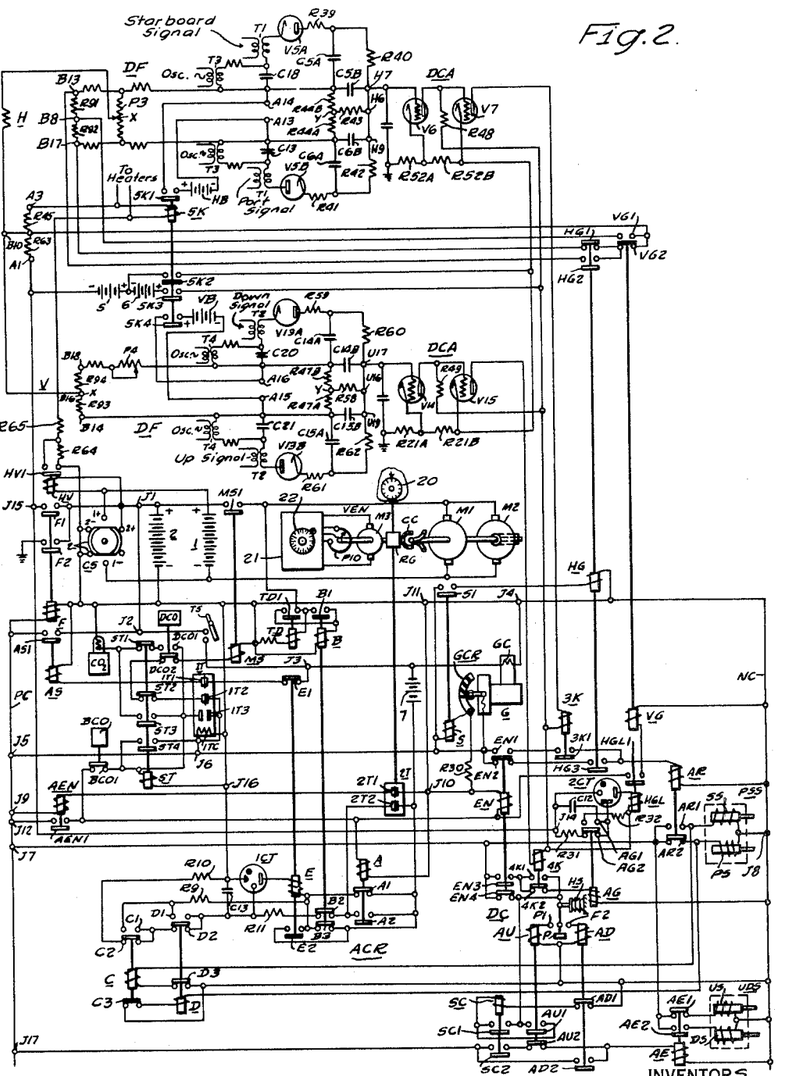
FIG. 2 is a diagrammatic showing of a complete torpedo control system, arranged for test purposes, including an embodiment of the present invention.

In the detail showing of this invention in FIG. 2, the components of the detector and filter circuit together with the direct-current amplifier for both the horizontal and vertical acoustic channels have been shown. Each of the detector circuits comprises a conventional bridge circuit. In the horizontal channel, the bridge circuit includes a potentiometer P3 and resistors R44B and R44A. The two diode tubes V5A and V5B, which function as detectors in the circuit, are disposed in circuit branches on opposite sides of the bridge circuit. A biasing battery, which may be termed the horizontal bias battery and which is designated HB, is connected through the contacts 5K1 of the relay 5K across the input terminals A13 and A14 of the bridge circuit, the positive terminal of the horizontal bias battery being connected to the terminal A14 and the negative terminal of this battery being connected to A13. A tap on the potentiometer P3 is connected to the terminal B10 which is grounded through the resistor R63 and the contacts F1 and F2 of the filament relay F. With this arrangement, the bridge circuit may be adjusted for balance by movement of the tap along the potentiometer P3 and in effect with the circuit connections illustrated with the bridge in balanced condition a center point of the horizontal bias battery HB will be effectively at ground potential. Thus the positive side of the horizontal bias battery HB will be approximately half of the battery voltage above ground, while the negative side of this battery will be approximately half of the battery voltage below ground. In this manner, a positive bias is applied through windings of the transformers T1 and T3 to the cathode of the diode V5A while a negative bias through other windings of T1 and T3 is applied to the plate of the diode V5B. For a balanced condition of the bridge circuit, these biases are of substantially the same magnitude, and hence the two diode tubes are biased to cut off by equal amounts. The resistors R91 and R92, which parallel the potentiometer P3, are inserted primarily for the purpose of controlling the sensitivity of the potentiometer.

The bridge circuit also forms part of a differential network associated with the diode tubes V5A and V5B. The plate of the tube V5A is connected through a resistor R39 to a resistance capacitance network including the condensers C5A and C5B and the resistor R40, while the cathode of the tube V5B is connected through a resistor R41 to a similar network including capacitors C6A and C6B together with a resistor R42. Both of these networks through the terminals H7, H6 and H9 connect with a resistor R43 in such a manner that the tube voltages and the charges on the associated capacitors produced by the electrical output of the tubes are in opposition across the resistor R43. The starboard signal and the port signal are applied respectively to the tubes V5A and V5B through the windings of a transformer T1 while the oscillator signal or sweep voltage is applied to both of the tubes through windings of the transformer T3.

The direct-current amplifier DCA comprises the two tubes V6 and V7. The tube V6 has its grid connected to the terminal H7 of the differential network. Hence the grid voltage of the tube V6 depends upon the differential of the voltages produced by the tubes V5A and V5B across the resistor R43, and the tube V6 is either conducting or non-conducting depending upon the magnitudes of the starboard and the port signals. Tube V7 is controlled in dependence of the plate voltage of the tube V6 and to this end has its grid connected with the plate circuit of the tube V6. The plate voltages for both of the tubes V6 and V7 are obtained from a battery 6 which is connected in series with a battery 5, the negative side of which is grounded through the contacts F2 of the filament relay. This plate voltage is applied to the system through contacts 5K3 of the relay 5K and to the plate of the tube V6 through a resistor R48, while that for the plate of the tube V7 is applied through the coil of the relay 3K. The cathode circuits of the tubes V6 and V7 are connected to the positive side of the battery 5 through the contacts 5K2 of the relay 5K. This circuit includes resistors R52A and R52B and terminates at ground. A small voltage is applied to the cathode of the tube V6 by means of the resistor R52A while the cathode of the tube V7 has applied thereto the output voltage of the battery 5. The circuit arrangement is such that when the tube V6 is conducting due to the control of its grid by the differential network the plate current flow thereof results in a drop in plate voltage. This drop in plate voltage biases the grid of the tube V7 more negatively and, as a consequence, V7 is cut off. Under these conditions, there is no plate current flow in V7 and the relay 3K, which after enabling and during operation of the acoustic gear, controls the steering rudder, remains deenergized. Conversely if the control of the grid of tube V6 by the differential network biases the tube V6 more negatively, the tube V6 passes less current and, as a consequence, its plate voltage rises. This rise in plate voltage causes the grid of V7 to become more positive and V7 passes current. With the occurrence of plate current flow in the tube V7, relay 3K is energized to initiate a reverse control on the steering rudders.

Under conditions in which the bridge circuit is balanced and the detector circuit is not influenced by the oscillator signal voltage or port and starboard signals, it will be apparent that the terminal H7 of the differential network will be substantially at ground potential.

The bridge circuit of the detector and filter circuit in the vertical channel, including the resistors R94 and R93 in adjacent legs and the resistors R47B and R47A in the remaining two adjacent legs, is controlled by the potentiometer P4. Unlike the bridge circuit of the horizontal channel, this circuit is unbalanced a predetermined amount by adjustment of the potentiometer P4. This adjustment is such that in the absence of an oscillator signal on the transformer T4 and the absence of an up or down signal on the transformer T2, a predetermined negative bias from the terminal U17 of the differential network is applied to the grid of the tube V14. As a consequence, the tube V15 is conducting and the plate current flow of this tube energizes the relay 4K which opertes through the depth control DC to control the up and down solenoids US and DS. As a consequence, a predetermined differential in magnitude of the up and down signals must exist, that is, the up signal must predominate by a predetermined amount to overcome this bias. The various details of the detector and filter circuit, as well as the direct-current amplifier, of the vertical channel, are similar to those of the horizontal channel. Terminal B10, which it will be noted is connected to a tap of potentiometer P3 in the horizontal channel, is similarly connected to terminal B16 in the vertical channel between the resistors R94 and R93. The vertical bias battery VB has its positive terminal connected through contacts 5K4 of relay 5K to terminal A16 of the bridge circuit and the negative terminal of the bias battery is connected to the terminal A15 of the bridge circuit. Thus in a manner similar to that in the horizontal channel detector and filter circuit, the tubes V13A and V13B are provided with cut-off biases. The plate circuit of the tube V13A is connected through a resistor R59 to the network including the capacitors C14A, C14B and resistor R60 while the cathode of the tube V13B is connected through the resistor R61 to the network including capacitors C15A, C15B and the resistor R62. Terminals U17, U16 and U19 complete the connections of the differential network which includes the resistor R58 connected between terminal y of the bridge circuit and the terminal U16. In the direct-current amplifier of the vertical channel, the resistors R21A and R21B provide the necessary cathode biases for the tubes V14 and V16. The principle here is similar to that embodied in the circuit connections of the cathodes of the tubes V6 and V7 of the horizontal channel. Plate supply for the tube V14 is obtained from a parallel branch of the circuit of battery 6 and it is applied to a resistor R49. The plate supply of the tube V15 is applied from the battery 6 through the coil of the relay 4K.

Referring now to the horizontal channel, the function of this portion of the network may be as follows: After passing through the A.C. amplifier, the alternate spurts of signals from the port and starboard hydrophones are impressed respectively on the diodes V5B and V5A of the detector circuit through the medium of the transformer T1. As previously noted, these diodes are connected to the horizontal bias battery through the output windings of the oscillator transformer T3 and signal transformer T1 in such a way that the plate of each diode is biased negatively with respect to its cathode. The oscillator signal voltage is so adjusted that its peaks are slightly less than the bias voltages so that when no hydrophone signal is present the diodes are non-conducting. When the signal superimposed on the oscillator peak voltage is sufficiently strong, the biases are overcome and rectified currents flow into the output networks of the diodes. Thus the function of the oscillator and the superimposed signal voltage is to enable one of the diodes and then the other in synchronism with the similar alternate enabling of the input tubes in the discriminator circuit. In effect it is as though there are separate input and detector circuits for each hydrophone but only one A.C. amplifier which is switched to join one set of circuits and then the other.

Assume first that there is no oscillator signal and no hydrophone signal applied to the transformers. Since the bridge is in balanced condition, there is no difference in potential between the terminals x and y. Thus there is no difference in potential between the grid of the tube V6 and ground due to the bias battery. If, however, the potentiometer is moved off center, a potential difference exists between the grid of tube V6 and ground. A movement of the potentiometer toward the positive side of the battery, that is, a movement of $x$ toward terminal B13 causes the terminal A1, which is essentially ground, to become positive with respect to $y$, and therefore the grid of the tube V6 becomes more negative with respect to ground. Conversely, a movement of $x$ toward the terminal B17 causes the grid to become more positive with respect to ground. This principle is utilized in the biasing control afforded by the gyroscope as will hereinafter become apparrent.

Assume now that there is power in both the oscillator signal and the hydrophone signal transformers T3 and T1, respectively. During the half-cycle that a diode is conducting, rectified signal power flows, for example, into the upper portion of the differential network from the tube V5A, and charges the condensers C5A and C5B. The charge dissipates itself at a relatively slow rate through the resistor R43 which is of relatively high ohmic value as compared with the other resistors of the network. This provides a time constant and gives a period of discharge that is long compared with the time per cycle of the oscillator signal. Thus the spurts of signal energy rectified by the diode maintain a fairly constant direct-current potential across the resistor R43.

While this direct-current potential across resistor R43 is being caused by the diode V5A, a direct-current potential in the opposite direction is being caused similarly by the other diode V5B. The resultant potential, either positive or negative in net value depending upon which diode receives the stronger signal, is impressed upon the grid of the tube V6 of the direct-current amplifier and causes the relay 3K to respond accordingly giving port or starboard rudder depending upon which the port or starboard signals predominate.

Consider the case when the starboard signal is stronger than the port signal. The rectified signal current through the starboard diode V5A flowing in the direction of plate-to-cathode charges the condensers C5A and C5B of the differential network in such a manner that current flow in the resistor R43 is in the direction of $y$ to H6. This biases the grid of the tube V6 more negatively with respect to ground. In a similar manner, the rectified signal current through the port diode V5B produces a bias on the grid of the tube V6 in a positive direction but the net bias caused by the signal is negative since the starboard signal is assumed to predominate.

Because of this negative bias, the plate current in the tube V6 decreases and the plate potential of V6 increases. This raises the grid potential of the tube V7 and carries this tube above its cutoff point causing current flow in the plate circuit thereof which includes the winding of the relay 3K. The control thus afforded by the relay 3K is such as to apply power to the starboard solenoid so that the rudders deflect toward the starboard and steering in that direction results.

The function of the detector and filter circuit and the direct-current amplifier of the vertical channel will be understood in connection with the description just given for the horizontal channel since the elements of the vertical channel are essentially a duplicate of those of the horizontal channel.

*Control circuit elements*

The various control circuit elements which function in conjunction with the acoustic gear to control the operation of the exercise shot torpedo are detailed in the lower portion of FIG. 2. This circuit system includes:

(1) A secondary battery system to provide energy for the control circuits. This battery is comprised of two sections designated 1 and 2, respectively. Section 2 of the battery is utilized, in addition to furnishing power along with the battery 1 to the propulsion motors M1 and M2, to furnish power to the control relays and other components of the control system. The circuit arrangement connecting these batteries includes the control switch CS which connects the batteries either in series or in parallel with the propulsion motor circuit.

(2) Steering is obtained through the medium of a contact-making free-running gyroscope which is impulse started by detonating a powder charge. Detonation in this instance is afforded by means of an electrical detonating cap, designated GC, and the products of combustion of the starting cartridge are utilized to accelerate the rotor of the gyroscope to operating speed. The gyroscope operates the port and starboard solenoids before enabling, and after enabling if the differential of the horizontal signals is too small.

(3) A depth control unit DC embodying a phase advance control for the depth rudder maintains the torpedo at a predetermined operating depth.

(4) A timer and variable enabler, respectively designated 2T and VEN, are driven during a torpedo run through a centrifugal clutch CC off the propulsion motors and prevent acoustic control until the torpedo has traveled a sufficient distance from the sound field of the launching craft or the sound field of a friendly craft to prevent unwanted automatic tracking. The variable enabler, as will hereinafter be apparent, permits a continually variable setting of the enabling distance prior to firing of the torpedo from the launching tube.

(5) A depth cutout DCO, which may be hydrostat, is utilized in the control system to stop the torpedo and exhaust the liquid ballast should the torpedo go below a predetermined safe operating depth. In this connection, a carbon dioxide flask, designated $CO_2$, is utilized to exhaust the liquid ballast from the torpedo. A broach cutout, designated BCO, functions in an opposite sense to stop the torpedo's run should the torpedo come to the surface.

(6) An anti-circling run circuit, designated ACR, functions in conjunction with the timer 2T of the variable enabler to prevent the torpedo from circling back and striking the launching craft should premature enabling occur. This circuit operates in conjunction with the relay E which deenergizes the auxiliary start relay AS to remove power from the control relays thereby deenergizing the motor switch MS and stopping the propulsion motors. In the war shot torpedo, stopping of the forward motion causes the torpedo to sink because of its negative buoyancy.

(7) A timer 1T is utilized in the exercise shot torpedo to control the operating sequence of the torpedo controls, in part, and to determine the length of the torpedo's run. This timer is interlocked with the stop relay ST which controls, in part, the application of electrical energy to the firing cap of the carbon dioxide flask as well as the motor switch MS.

(8) The switch over control from gyroscope steering and depth control to the acoustic gear is obtained in a control system including the control tube 2CT which is of the gas-filled type. Breakdown of this tube is controlled by the vertical acoustic channel through the relay 4K controlling the auxiliary gate relay AG which has immediate control of the tube 2CT.

(9) Enabling of the torpedo for acoustic control is inhibited by the relay EN which in turn is controlled by the auxiliary enabling relay AEN. Relay AEN is energized depending upon the setting of the distance switch 2T1 of the variable enabler timer 2T. Thus an accurate control of the time or distance, when enabling is had, is obtained.

*Propulsion motor system*

As illustrated in the drawings, the propulsion motor system of the torpedo includes the two motors M1 and M2. Physically this arrangement involves a pair of armatures disposed within a single frame in tandem relationship. These armatures react with the field produced by the stator windings (not shown) in such a manner that they rotate in opposite directions. The armature or rotor of forward motor M1 is disposed upon a shaft which extends through the armature of the motor M2 and is connected with the aft propeller of the torpedo (not shown). The armature of motor M2 engages a hollow shaft concentrically of the shaft of M1 and this shollow shaft engages the forward propeller (not shown) of the twin screw drive of the torpedo. By properly matching the torpedo propellers, which rotate in opposite directions as a result of these connections, the propeller torques may be balanced to obviate any measurable turning moment about the longitudinal axis of the torpedo which would interfere with the directional control.

As previously noted in the general discussion in the opening pages of this disclosure, it is desirable that the torpedo have two speeds of operation. The connections afforded by the controller switch CS, for the batteries 1 and 2 and the propulsion motors M1 and M2, provides either a series or parallel connection of the batteries 1 and 2 with the propulsion motors, the parallel connection providing the low operating speed and the series connection providing the higher operating speed. Rotation of the control switch CS clockwise to bridge the switch terminals 2— and 1+ connects the batteries 1 and 2 in series with the propulsion motors. This circuit may be traced from the positive terminal of battery 1 to the terminal 1+ of the control switch, thence to the terminal 2— of the control switch to the negative terminal of battery 2. The circuit continues through the motor switch contacts MS1 to the propulsion motors and returns to the negative side of the battery 1. The parallel connection of batteries 1 and 2 with the propulsion motors is obtained by counterclockwise rotation of the control switch so that its contacts bridge the control switch terminals 1+ and 2+. With this connection, the positive terminals of both batteries 1 and 2 are connected through the motor switch contacts MS1 to one side of the propulsion motor while the negative terminals of both batteries are connected through the terminal 1— of the control switch and its adjacent terminal 2— to the opposite side of the propulsion motors.

*Electro-acoustic circuit energization*

It will be observed, that irrespective of the series or parallel connection of the batteries to the propulsion motors, it is the voltage between the battery 2 terminals at which power is supplied to the various other elements of the control system. It will also be understood that the voltage across the battery 2 and under load will be different for the series connection than for the parallel connection due to the different current drain for the series and parallel conections, the voltage of battery 2 being smaller when in series with battery 1 due to the high current drain. This voltage change is not sufficiently large to adversely affect such system components as the relays. However, it is desirable that the filament voltages of the tubes be maintained substantially constant to assure uniformity of operation of the acoustic gear. The filament voltage is obtained in a circuit paralleling the relay 5K which, including in series therewith the resistors R64, R65, R63 and R45 and contacts F1, is connected between control switch terminal 2— and the positive terminal of battery section 2, and therefore changes in value with changes in the voltage of battery 2 for the series and parallel battery connections. This change, however, is largely offset or compensated by shorting resistor R64 by means of the relay HV which is energized by the battery 2 only when the batteries are connected in series (the condition in which the control switch CS is rotated clockwise to bridge 2— and 1+). One end of HV relay coil is connected to the positive terminal of battery 2, which also connects to ground through the contacts F2 when relay F is energized. From the other end of the HV relay coil the circuit continues to the contacts 1+ of the control switch now joined to 2— and terminates at the negative side of battery 2. The contacts HV1, when closed, short the resistor R64 and thus increase the current through the filament circuit or the voltage drop thereacross corresponding to that existing when the batteries are in parallel.

*Variable enabler adjustment*

Prior to launching of the torpedo, the variable enabler is adjusted to provide the desired distance setting at which enabling occurs. Details of the variable enabler herein disclosed may be found in the copending application of T. A. Daly and H. A. Gill, Serial No. 711,418, filed November 21, 1946, entitled Variable Enabler, now Patent No. 2,615,416, and assigned to the same assignee as this application. Briefly, there are two ways of setting the variable enabler. One method includes a hand adjustment by means of the dial 20 which is located on the variable enabler within the torpedo body. Access to this dial is obtained by opening a small port in the torpedo hull. When the dial 20 is rotated, the gears of the drive involving the centrifugal clutch drive timer 2T in a direction to set any desired time or distance not less than 500 yards into the contacts 2T1 and 2T2 of the timer. Contacts 2T2 do not open until the setting is in excess of 410 yards. For manual settings the safety feature is a mechanical stop at 500 yards. For electrical settings the safety feature is had in the contacts 2T2 which remain closed until the 410 yard setting is exceeded and provide the safety cutout in the anti-circling run circuit. Details of the construction may be obtained from the abovementioned copending application of T. A. Daly and H. A. Gill. The contacts 2T1 and 2T2 with this setting of the dial 20 are open. These contacts may be driven by suitable cams having configurations for effecting closing thereof in the desired sequence. In the instant case, the contacts 2T2 close ahead of the contacts 2T1 for the minimum enabling range which may be set into the timer. The purpose for this will become apparent in a discussion hereinafter given concerning the anticircling run control ACR.

The variable enabler may also be adjusted by means of an electrical follow-up control, including a control unit 21 provided with a hand-operated dial 22. This control unit is located within the submarine and by a suitable cable connection with the torpedo in the launching tube controls the motor M3 which by its connection through the reduction gearing of the centrifugal clutch assembly also operates the timer 2T. The electrical connections for this circuit involve a simple bridge circuit of which the the potentiometer P10 forms a pair of adjacent legs, the resistance of each of which depends on the position of the variable tap driven by the motor M3. The dial 22 drives a similar potentiometer tap on a potentiometer forming the remaining two adjacent legs of the bridge circuit. The particular system, herein employed, is A.-C. operated and depends upon instantaneous reversals of phase of the bridge output voltage to the bridge input voltage to obtain reversing control of the motor M3. Thus by either of the methods herein disclosed, the variable enabler may be set to provide the desired enabling distance. The follow-up control, however, provides a means for making last minute corrections in the setting of the enabling distance to vary the enabling of the torpedo in correspondence with last minute changes required by the scene of activity.

The timer 1T may be driven by a simple clockwork mechanism. It is provided with the three sets of contacts 1T1 and 1T2 which are normally closed and 1T3 which is the normally open set. The contacts 1T1 are the last contacts to operate on the timer. When these contacts open, the energizing circuit for the auxiliary start relay AS is opened and the power supply to the system is removed. The contacts 1T2 and 1T3 may operate together. The contacts 1T2 open the circuit for the motor switch MS and remove power from the propulsion motor circuit. The contacts 1T3 upon closing complete the energizing circuit for relay ST and its contact ST3 energizes the firing cap circuit of the carbon dioxide flask. At this time, the contents of the flask are discharged into the ballast chamber of the torpedo and the liquid ballast is ejected to cause the torpedo to surface.

*Exercise run operation*

This torpedo operation will probably be better understood upon a consideration of the function of the control system for an exercise run which proceeds without incident. Prior to launching the torpedo, the control switch CS is positioned to connect the batteries 1 and 2 in either series or parallel circuit relation with the propulsion motors. The variable enabler is then adjusted to provide the desired enabling distance, and let it be assumed, for the purpose of this discussion, that enabling distance will be less than the distance afforded by the setting of the contacts of the timer 1T. With this setting of the variable enabler timer, the contacts 2T1 and 2T2 are open. At the instant of launching of the torpedo, the trigger switch TS is closed. This completes an energizing circuit for the detonating cap of the gyroscope which may be traced from junction J1 at the positive side of battery 2 to the terminal J2. The circuit continues through the now closed contacts of the trigger switch through the gyro cap GC to the terminal J4 and the negative side of battery 2. This ignites the powder charge of the starting cartridge for the gyroscope and, in the matter of a fraction of a second, the gyroscope wheel is accelerated to full operating speed. Closure of the trigger switch TS also establishes an energizing circuit for the auxiliary start relay AS. This circuit proceeds through the trigger switch to the junction J3, through the contacts E1 and 1T1 to the coil of the auxiliary start relay AS and the negative side of battery 2. The auxiliary start relay thus closes substantially instantaneously with closure of the trigger switch and its contacts AS1 connect the positive side of battery 2 to the positive conductor PC. When the positive conductor PC is energized a circuit is completed from terminal J5 to terminal J6 and extends through the normally closed timer contacts 1T2 and the normally closed stop relay contacts ST2 to the normally closed contacts DCO2 of the depth cutout DCO. From this point, the circuit continues through the coil of the motor switch MS to the negative side of battery 2. This energizes the motor switch which closes its contacts MS1 and connects the propulsion motors to the batteries 1 and 2. Thus the torpedo is operating under its own power substantially at the instant that it leaves the torpedo tube. At the same time, the timer 1T begins to operate. This timer is normally locked against operation by means of a small electromagnetically operated clutch (the coil alone being shown), generally designated 1TC. This clutch contains a small coil and the coil thereof is now energized in a circuit from the positive conductor PC to the negative terminal of battery 2 including the junction points J5 and J6. The timer is released for operation.

The gyroscope G is mounted in the torpedo so that it has three axes of freedom. Therefore, the gyroscope tends to maintain a fixed position directionally in space. The gyroscope is equipped with a small arm having a roller mounted at its extremity which operates or rolls along an arcuate segment forming a compass relay GCR. This arcuate segment is formed in two halves, one of which is of conducting material and the other of which is of electrical insulating material. Normally the gyroscope is aligned by a caging mechanism which is released when the gyroscope rotor has accelerated to full speed so that the gyroscope spin axis parallels the longitudinal axis of the torpedo. If it is desired to have the torpedo proceed on a direct course indicated by the direction in which the launching tube is pointed, the arcuate segment of the gyro compass relay is positioned so that the dividing line between the conducting and non-conducting segments thereof is at the point of tangency of the roller and the arcuate segment. If it is desired to have the torpedo complete a partial circle to either port or starboard after launching, the arcuate conducting segment may be shifted by suitable means (not shown) relatively to the gyroscope so that the roller lies completely on the conducting portion or the non-conducting portion of the arcuate segment.

The contacts of the gyro compass relay control the relay S, this relay being energized in a circuit from the positive conductor PC including the junctions J5 and J6, the coil of the relay S and a resistor R30 to the negative side of the battery 2. The coil of the relay S is paralleled by the contacts of the gyro compass relay. Hence when the roller of this relay is on the conducting portion of the arcuate segment, the coil of the relay S is shunted from the energizing circuit and, when the roller is on the non-conducting portion of the arcuate segment, the shunt circuit is opened and the coil of the relay S is energized.

The relay S is provided with a single set of contacts S1 which are connected in series with the coil of the horizontal gate relay HG. Prior to enabling the torpedo, the contacts HG3 of the horizontal gate relay control the energization of the auxiliary rudder relay AR which in turn, by means of its contacts AR1 and AR2, respectively, control the energization of the starboard and port solenoids SS and PS, respectively. The coil of the auxiliary rudder relay AR is connected in a circuit extending from the positive conductor at junction J5 through the contacts EN2 of the enabler relay EN through the contacts HG3 of the horizontal gate relay to the coil of the auxiliary rudder relay and the negative conductor NC. Thus, for the specific circuit shown, if the torpedo were off course to the starboard, the roller operated by the gyro would be in a position engaging the conducting portion of the arcuate segment. As a consequence, the relay S is deenergized by the shunt circuit of the gyro compass relay and the relay HG is in its deenergized position shown in the drawing. Since the contacts HG3 are open, there is no circuit for the coil of the auxiliary rudder relay and this relay remains in the deenergized position shown with its contacts AR2 closed. This completes an energizing circuit between the positive and negative conductors between junction points J7 and J8 and operates the port solenoid to apply port rudder. As the torpedo swings back through its neutral position, the roller actuated by the gyro runs off the conducting portion of the arcuate segment opening the circuit shunting the relay S. As a consequence, the relay S is energized and closes its contacts S1, picking up the horizontal gate relay HG which closes its contacts HG3 to energize the coil of the auxiliary rudder relay. Closure of the contacts AR1 thereof energizes the starboard solenoid SS to apply starboard rudder and swing the torpedo toward the starboard. It will be apparent that the control afforded by the system is hardover-to-hardover, and that the path of the torpedo will be approximately sinusoidal about the direct course which the torpedo is taking.

At the same time that the steering control for the torpedo is energized, the depth control for the torpedo is energized in a circuit extending from the positive control conductor at junction J7 through the closed contacts EN4 of the enabling relay to the depth control DC involving the phase advance control for the depth rudders. This control will be described in detail hereinafter but, for the present, it will suffice to state that the control operates to cause the torpedo to dive after leaving the torpedo tube to the predetermined operating depth which may be of the order of 80 feet and to maintain this depth until control by the acoustic gear is taken over. Thus the torpedo proceeds at its proper operating depth and along the selected course toward the target entirely under the influence of the gyro and the depth control.

With the closure of the trigger switch and operation of the auxiliary start relay AS, the filament relay F is energized. This relay closes its contacts F1 and F2, the contacts F2 grounding the positive side of the battery 2 and the contacts F1 completing an energizing circuit through the resistors R63 and R45 for the relay 5K and, at the same time, connecting the terminal B10 to ground. Terminal B10, it will be recalled, is connected to the tap on the potentiometer P3 of the horizontal channel detector and filter circuit, and to the terminal B16 of the detector and filter circuit of the vertical channel placing ground potential at these two points. The energizing circuit for the relay 5K extends from the positive side of the battery 2 through contacts F1, the resistors R63 and R45 through the coil of the relay 5K, and resistors R65 and R64 to the negative side of battery 2. Relay 5K closes its contacts 5K1 through 5K4 connecting the horizontal and vertical bias batteries HB and VB, respectively, in the horizontal and vertical acoustic channels and applying the plate and cathode potentials to the direct-current amplifier in both channels in the manner hereinbefore described. The heater circuits for the tubes are connected in parallel with the energizing circuit of the relay 5K. These circuits have not been detailed since it is felt that their connection is well understood. As a result of the operation of the relay 5K and the filament relay F, the acoustic system is placed in operating condition. However, it is prevented from influencing the operation of the torpedo prior to enabling because of open circuits through contacts of the enabling relay.

When the torpedo has traveled the distance necessary for the contacts 2T1 of the variable enabler timer EN to close, an energizing circuit for the coil of the auxiliary enabler relay AEN is completed. This circuit begins at the junction J9 on the positive conductor and extends through the coil of the auxiliary enabler relay through the contacts 2T1 of the variable enabler timer to junction J10 and connects with the negative side of the battery at the junction J11. Closure of the contacts AEN1 completes an energizing circuit from the junction J12 of the positive conductor for the coil of the enabler relay EN. This circuit is completed through the junctions J10 and J11 to the negative side of the battery. At this time, the enabler relay closes its contacts EN1 and EN3 while opening its contacts EN2 and EN4 which had maintained the torpedo directly under the influence of the gyro and depth control. Upon closure of the contacts EN1, the circuit for energizing the auxiliary rudder relay is transferred from the contacts HG3 of the horizontal gate relay to the contacts 3K1 of the relay 3K which is controlled by the output of the direct-current amplifier of the horizontal channel. In a similar manner, the operation of the depth control of the torpedo, is now controlled in part by contacts 4K1 of the relay 4K. Relay 4K, it will be remembered, is energized normally by the output of the direct-current amplifier DCA in the absence of a sufficiently strong differential signal in the vertical acoustic channel.

Thus let it be assumed for the moment that the torpedo has not yet entered a sound field sufficiently strong to overcome the normal bias of the vertical acoustic channel. Under this condition, the relay 4K will remain energized and its contacts 4K1 will be closed, to apply energy to the depth control system in a manner similar to that applied through the contacts EN4. As previously described, the torpedo will therefore proceed at the assumed depth of 80 feet.

Returning now to the control of the horizontal channel afforded by the gyroscope G, the relay S continues to control the horizontal gate relay HG. As a consequence, the relay HG is alternately opening and closing its contacts HG1 and HG2. These contacts are respectively connected with the terminals B17 and B13 of the bridge circuit of the horizontal acoustic channel, and with ground through the presently closed contacts VG2 of the vertical gate relay VG, this circuit is traceable to the terminal B10 and ground through the filament relay contacts F2. As a result of the operation of the horizontal gate relay under the influence of gyroscope control, the contacts HG1 alternately ground the opposite sides of the bridge circuit of the horizontal channel. As will be recalled in connection with the discussion concerning the effect of unbalancing the bridge circuit by the potentiometer P3, grounding of the terminal B13 causes the terminal A1 (ground) to become positive with respect to Y and therefore the grid of V6 becomes more negative with respect to ground. The consequent reduction of plate current of tube V6 causes tube V7 to conduct and the relay 3K is energized. Conversely, grounding of the terminal B17 by the contacts HG1 causes the grid of V6 to become more more positive with respect to ground and the resulting increase in plate current flow cuts off the tube V7 and the relay 3K is deenergized. Following this sequence through the control afforded by the gyroscope should the torpedo be off course to the starboard, the relay S is deenergized and as a result the HG relay is deenergized and its contacts HG1 are closed. This grounds the terminal B17 and for the assumed condition of operation, the tube V7 is not conducting. Relay 3K is therefore deenergized and its contacts 3K1 are open. Since contacts 3K1 are open, the energizing circuit for the auxiliary rudder relay are open and the contacts AR2 thereof are closed. This completes the energizing circuit for the port solenoid PS applying port rudder and causing the torpedo to swing back on course again. As the torpedo overshoots its own course position, a port heading thereof results. The roller actuated by the gyroscope moves over the non-conducting segment of the gyro compass relay. Relay S picks up and energizes horizontal gate relay HG. This closes the contacts HG2 of the horizontal gate relay and grounds the terminal B13. The grid of tube V6 therefore becomes more negative and the resulting decrease in plate current causes the plate voltage thereof to rise and the tube V7 passes current. Energizing relay 3K through its contacts 3K1 energizes the auxiliary rudder relay and applies starboard rudder through energization of the starboard solenoid by the contacts AR1. The torpedo against follows the roughly sinusoidal path it had pursued prior to enabling and the influence of gyroscope control remains until the torpedo is completely enabled for acoustic operation.

Assuming now that the torpedo is entering a sound field along a chord of the sound field circle such that the signal of the starboard solenoid predominates, and that the differential signal resulting from this condition is sufficient to overcome the biasing effect on the detector circuit produced by the horizontal gate relay under the influence of the gyroscope, the predominating current flow of the starboard signal from terminal y to H6 biases the tube V6 more negatively and, as a consequence, the tube V7 conducts and the relay 3K is energized to apply starboard rudder and steer the torpedo in the direction of a target signal. As the torpedo swings toward the target, the differential between the starboard signal and the port signal decreases to a point where the gyro biasing action overrides the differential signal. The control afforded by the gyroscope therefore tends to steer the torpedo along the gyro course. Again the starboard signal will predominate to apply starboard rudder and swing the torpedo back toward the target. As a consequence, the average course of the torpedo will be along a curved path directed toward the target.

Since the torpedo is operating at a depth considerably below the surface vessel from which the target signal emanates, the upper hydrophone signal will be stronger than the lower hydrophone signal. As the torpedo approaches the target, the signal differential will steadily increase due to the increasing angle of elevation of the target with respect to the hydrophones. Eventually a point will be reached at which the upper hydrophone signal will be sufficiently strong to produce a differential signal in excess of the normal bias existing in the bridge circuit of the vertical channel. The differential signal resulting from the predominating up signal and being caused by current flow from U16 to point Y in the vertical bridge circuit drives the grid of the tube V14 more positive. The resulting increase in plate current of V14 and accompanying plate potential drop cuts off the tube V15 and the relay 4K is deenergized to deenergize the phase advance depth control. When the phase advance depth control is deenergized, the energizing circuits for the auxiliary elevator relay AE are open and the contacts AE1 thereof are closed. This energizes the up solenoid in a circuit branch paralleling the port and starboard solenoids between the positive and negative conductors and causes the torpedo to rise to attack the target. As the nose of the torpedo points upwardly toward the target under the influence of the up rudder control, the signal differential drops and the normal bias in the bridge circuit of the vertical channel predominates causing an output of the direct-current amplifier which energizes the relay 4K. Again the phase advance depth control takes over tending to nose the torpedo down and when the up signal again predominates sufficiently the cycle is repeated. As the torpedo approaches the target more closely, the signal differential increases in magnitude and eventually a point is reached wherein the required level of signal differential is maintained for a sufficient period of time that complete transfer to acoustic control may be effected.

This complete transfer to acoustic control is effected through the control of relay AG, the auxiliary gate relay, by the relay 4K. The auxiliary gate relay forms part of a time delay control which includes the control tube 2CT which is of the gas-filled type. The cathode of this tube is connected to ground in a circuit including junction J14, J15 and the contacts F1 and F2 of the filament relay. The plate of the control tube 2CT is connected to the positive terminal of the battery 6 in a circuit including the coil of horizontal gate lockup relay HGL and the contacts 5K3 of the relay 5K. The firing anode of the tube 2CT is connected to ground through the normally closed contacts AG2 of the auxiliary gate relay and the resistor R31 which connects with the junction J14. A capacitor C12 is connected between the cathode and the firing anode of this tube and as a consequence is short-circuited when the contacts AG2 are closed. When the relay AG is energized by the relay 4K, its contacts AG1 connects the capacitor C12 in series with a resistor R32 between ground and the positive side of the battery 6 to cause capacitor C12 to charge. The charging rate of capacitor C12 is determined by its farad value and the ohmic value of the resistor R32, and is selected to provide the desired time interval before the capacitor voltage exceeds the breakdown voltage of the tube, so that only a sound field of sufficient intensity will serve for adequately controlling the torpedo.

Assuming now that the relay 4K is deenergized due to a predominating up rudder signal, the relay AG is energized and its contacts AG1 are closed initiating charging of capacitor C12. If the torpedo is sufficiently close to the target so that the differential signal of required magnitude is maintained for the time interval required for the capacitor voltage to break down the control tube, the tube fires and thereafter operates independently of the auxiliary gate relay, and a circuit therethrough for energizing the horizontal gate lockup relay HGL is completed. This circuit extends from the positive side of the battery 6 and the contacts 5K3 through the horizontal gate lock-up relay coil and the tube 2CT to the junction J14 which is connected to ground through the contacts of the filament relay. Energization of the horizontal gate lockup relay causes the contacts HGL1 thereof to close and complete an energizing circuit for the coil of the vertical gate relay VG which includes the auxiliary enabler contacts AEN1, the contacts HGL1 and the coil of the vertical gate relay.

The contacts VG2 of the vertical gate relay now open and the contacts VG1 thereof close. This disconnects from ground the contacts HG1 and HG2 of the horizontal gate relay which formerly biased the bridge circuit of the horizontal channel, and connects the terminal B8, which is a center tap of the resistor combination R91 and R92 straddling the input terminals of the bridge circuit, to ground. Thus the bridge is restored to electrical equilibrium and the influence of the gyro biasing potential is removed completely. As a consequence, the torpedo now follows a course determined entirely by the differential signal of the horizontal channel. The average course is always directed at the signal source or target.

Neglecting for the moment the function of the broach cutout, if for some reason the torpedo should miss the target on its first pass, the signal differential in the vertical channel will be insufficient to maintain the relay 4K deenergized and keep up the elevator on the torpedo. Relay 4K will therefore be energized and the phase advance depth control will be effective to cause the torpedo to dive. After proceeding beyond the target, the torpedo will tend to turn either to the port or to the starboard depending upon which hydrophone in the horizontal channel is receiving the stronger signal. As the torpedo circles and dives to come back to the attack, the up signal will again predominate sufficiently to deenergize the relay 4K and remove the effect of the depth control. Up rudder is again applied and, at the same time, the torpedo orients itself directionally to renew its attack upon the target or signal source. This action will continue until such time as contact with the target is made and in the war shot torpedo the inertia switch detonates the warhead. In the exercise shot torpedo the broach cutout initiates blowing of the ballast and stopping of the propulsion motors.

In the test torpedo, should the torpedo broach, the broach cutout contacts BCO1, which open when the torpedo submerges, will close. Closure of the contacts BCO1 establishes an energizing circuit for the coil of the stop relay ST. This circuit extends from the positive conductor at the junction J12 through the contacts AEN1 of the auxiliary enabler relay through the broach cutout contacts BCO1 and the coil of the stop relay to junction J16 which connects with the negative terminal of the battery 2. The stop relay picks up and closes its contacts ST4 which maintains an energizing circuit for the coil of the electromagnetic clutch 1TC of the timer 1T. The contacts ST3 close and complete an energizing circuit for the firing cap of the carbon dioxide flask $CO_2$. To discharge of the cartridge which follows open the valve of the carbon dioxide flask permitting the contents of the flask to exhaust into the ballast chamber of the torpedo ejecting the ballast fluid and rendering the torpedo buoyant. The contacts ST2 open and deenergize the coil of the motor switch MS. MS now drops out and deenergizes the propulsion motor circuit. When the time setting of the timer 1T has expired, the contacts 1T1 open and open the energizing circuit for the auxiliary start relay AS. This opens the auxiliary start relay contacts AS1 and disconnects the positive conductor PC from the positive side of the battery 2. As a consequence, all of the control elements of the system are deenergized.

If during the course of its operation the torpedo had proceeded to a depth beyond safe limits, the contacts of the depth cutout would have been actuated, contacts DCO2 opening and contacts DCO1 closing. Opening of the contacts DCO2 disconnect the coil of the motor switch and deenergizes the propulsion motor, while closure of the contacts DCO1 fires the cartridge of the carbon dioxide flask to render the torpedo buoyant. This circuit includes the contacts of the auxiliary enabler relay, the broach cutout contacts BCO1, the contacts DCO1 of the depth cutout which are now presumed to be closed and the contacts ST1 of the stop relay through the firing cap of the $CO_2$ flask to the negative side of the battery 2.

The phase advance features of the depth control unit are covered in detail in a copending application of H. L. Prescott, Serial No. 653,188, filed March 8, 1946, entitled Control System, now Patent No. 2,580,834, and assigned to the same assignee as this application. In the conventional type of depth control, a pendulum closes the contact to operate the elevator solenoids as soon as the pitch angle of the torpedo passes the neutral position. The delays in operation of the relays, torpedo inertia and other mechanical components cause the torpedo to proceed a considerable distance away from the neutral position before the elevators are actually thrown, thus causing wide variations in pitch angle during the running of the torpedo. The function of the phase angle advance control circuit is to anticipate this departure from course and to apply the elevator control in advance of that which would result from the conventional use of the pendulum. This is accomplished essentially by reversing the usual action of the control circuits so that the up rudder is controlled by the pendulum contact which closes when the nose is up and the down rudder is controlled by the contact which closes when the nose is down, and both rudders are operated by the opening rather than the closing of their respective pendulum contacts. In addition, a bias is applied to the pendulum by a source which is a function of water pressure and, therefore, an indication of the depth at which the torpedo is operated. In the drawing, this is accomplished by means of a hydrostat HS which may be a simple bellows or diaphragm which is exposed to water pressure and which is connected mechanically with the arm of the pendulum. Thus if the torpedo is operating too deep or too shallow, a corresponding bias on the pendulum is produced to correct the operating condition.

When the torpedo is fired, the forces of acceleration acting on the pendulum P closes the high contacts which are designated P2 in the drawing. Closure of these contacts prior to enabling of the torpedo establishes an energizing circuit from the positive conductor at junction J7 through the contacts EN4 and the pendulum arm to the coil of the auxiliary down relay AD to the negative conductor NC. Relay AD picks up, opening its contacts AD1 and closing its contacts AD2. This completes an energizing circuit from the positive conductor at junction J17 through the closed contacts AD2 and the coil of the auxiliary elevator relay AE to the negative conductor NC. The auxiliary elevator relay picks up and closes its contacts AE2 while opening its contacts AE1. The up rudder solenoid US is deenergized and the down rudder solenoid DS is energized, applying down rudder. The torpedo, therefore, immediately starts down upon firing. As soon as the torpedo leaves the tube and the acceleration is over, the normal operation of the depth control then continues. The force exerted on the pendulum by the hydrostat HS during the initial diving period is sufficent to maintain down rudder within a given limit of pitch angles. Thus the torpedo is prevented from diving at too steep an angle and thereby possibly overshooting by a considerable margin the selected depth of operation.

Assuming now that the torpedo is operating at the selected depth and that the nose is headed down, the contacts P1 close. This energizes the auxiliary up relay AU closing its contacts AU1 and opening its contacts AU2. This completes an energizing circuit for the sequence control relay SC which extends from the junction J7, through the contacts EN4, through the closed contacts AU1, the coil of the sequence control relay SC, and the contacts AD1 which are now closed to the negative conductor. The sequence control relay closes its contacts SC1 and SC2. Contacts SC1 parallel the contacts AU1 and maintain the sequence relay energized independently of the auxiliary up relay. Contacts SC2 complete a partial energizing circuit for the coil of the auxiliary elevator relay but this circuit is presently broken in the contacts AU2 which are now open. Under these conditions, the up solenoid is energized and up rudder is applied to the torpedo tending to cause the torpedo to reverse its angular movement and to swing to an up-nose position. As the longitudinal axis of the torpedo swings through its neutral position, the contacts P1 of the pendulum open and deenergize the auxiliary up relay. The contacts AU2 now close and the auxiliary elevator relay is energized in a circuit between the positive and negative conductors including the closed contactors SC2 and AU2. Thus while the torpedo is swinging about its pitch axis to up-nose position, the contacts AE2 are closed to apply down elevator. Due to the inertia of the torpedo, however, the torpedo continues to swing nose up a short interval of time after the down elevator is applied. Meanwhile, in the nose-up position, the contacts P2 of the pendulum close and energize the auxiliary down relay. The contacts AD2 maintain the coil of the auxiliary elevator relay energized. With a continued application of down rudders, the torpedo is accelerated angularly in a nose-down direction and eventually again reaches its neutral position wherein the contacts P2 open and the contacts P1 close. This causes the control cycle in the vertical plane to be repeated.

As previously mentioned, after enabling the contacts EN3 are closed. During periods when the sound field sensed by the vertical acoustic channel is insufficient to deenergize the relay 4K, the energizing circuit for the phase advance depth control is maintained through the contacts EN3 and 4K1. However, when the relay 4K is deenergized due to the influence of a strong differential signal in the vertical channel indicating that a target lies above and in proximity of the torpedo, the relay 4K is deenergized. Thus the contacts 4K1 are open and the energizing circuit for the phase advance depth control is interrupted. Under this circumstance, it will be apparent that the auxiliary elevator relay will remain in its deenergized position with its contacts AE1 closed and the up solenoid energized to apply up rudder causing the torpedo to rise to attack the target.

The control afforded by the anti-circular run control in conjunction with the variable enabler, it will be recalled, protects the launching craft from attack by the torpedo should the torpedo be prematurely enabled after launching. In a manner similar to the switch over control of the torpedo to the acoustic gear, the anti-circling run circuit employs a gas tube 1CT which functions as the trigger in the control system. The cathode of this tube is connected to the negative side of the battery 2, while the plate of this tube is connected through the coil of the relay E and contacts of the relay A1 to the positive side of a battery 7 which is connected through the trigger switch TS in series with the battery 2. A parallel branch of this circuit extends through the contacts B3 of the relay B. A capacitor C13 is connected between the cathode and the firing anode of the control tube 1CT and the charging of this capacitor is had in one instance by operation of the relays C and D which respectively parallel the starboard and port solenoids and in another instance by the contacts B2 and either of the parallel connected contacts A2 and 2T2. In the first instance, resistor R9 is connected by contacts of the relays C and D in an energizing circuit to charge the capacitor at a given rate. In the second instance, a resistor R11 of sufficiently low ohmic resistance provides rapid charging of the capacitor to cause a quick breakdown of the tube. The purpose of this arrangement will better be understood by considering the function of this system for an assumed operating condition.

Let it be assumed that through inadvertence, the torpedo is enabled for acoustic steering at the time of firing. For this condition, the variable enabling timer 2T would have been improperly set and the contacts 2T1 thereof and 2T2 would be closed at the time of firing. As a consequence, an energizing circuit for the auxiliary enabling relay is established through the timer contacts 2T1 including the junction points J9, J10 and J11 for the complete energizing circuit. Operation of the auxiliary enabler relay energizes the coil of the enabler relay EN and this relay operates to establish the switchover circuits to acoustic control. Since the torpedo would be operating in the sound field of the launching craft, the acoustic field would be sufficiently intense to provide a complete transfer to acoustic control by reason of the control effect of the relay 4K responsive to the vertical acoustic signal on the tube 2CT. Thus the tendency of the torpedo under complete acoustic control would be to circle and attack the launching craft. Under these conditions, the energizing circuit for the relay A is completed through the auxiliary enabler contacts AEN1. Thus the contacts A2 of this relay are closed. It will be noted that the contacts 2T2 of the variable enabler timer parallel the contacts A2 of the relay A. This affords a margin of safety in the event of failure of either set of the mentioned contacts. The contacts A2 and 2T2 cooperate with contacts of the relay B. Relay B, in turn, is energized by closure of the contacts TD1 of the relay TD. Each of these relays respond to energization of the propulsion motor circuit and thus do not operate until the motor switch MS has closed. Relay TD is a time delay relay and the control of the relay B afforded thereby is such as to provide approximately 5 seconds delay in the present case before the relay B closes. When relay B closes, its contacts B1 provide a holding circuit for the coil thereof which is independent of the contacts TD1 of the time delay relay. For the assumed conditions, however, the relay B due to the time delay in operation provides a circuit through the contacts B2 thereof in conjunction with the now closed contacts A2 and 2T2 for the capacitor C13. This circuit extends from the battery 7, which it will be recalled is connected in series with the main battery 2 and which passes through the contacts A2 or 2T2 through the contacts B2 and resistor R11 to the capacitor C13 where the circuit extends to the negative side of the battery 2. As previously noted, the resistor R11 is of sufficiently low ohmic value that rapid charging of the capacitor C13 is obtained. This may be so adjusted that a breakdown voltage for the tube 1CT may build up across the capacitor in as little as 1/10 of a second. Thus the tube fires almost immediately if the torpedo is enabled at the time of launching and upon firing an energizing circuit for the coil the relay E is established. This circuit is traceable from the positive side of the battery 7 through the contacts B3, the coil of relay E, the tube 1CT and thence to the negative side of battery 2. Energization of the relay E causes the contacts E1 thereof to open. Contacts E1 are disposed in series circuit with the coil of the auxiliary start relay AS. Hence this relay is deenergized and its contacts AS1 open to remove power from the positive conductor FC. Removal of power from the positive conductor deenergizes the control relays and as a consequence the motor switch MS drops out and opens the propulsion motor circuit, stopping forward motion. Stopping of the forward motion of the war shot torpedo causes that torpedo to sink because of its negative buoyancy, and danger to the launching craft is thus eliminated.

Another condition which is equally dangerous results from improper operation of the steering solenoids such as sticking of the relays and improper gyro operation. Normally, during the interval prior to enabling, the torpedo follows a course controlled by the setting of the gyroscope G, and the port and starboard solenoids during this interval will have been alternately operating. This alternate operation of the port and starboard solenoids energizes the relays C and D connected in parallel therewith as previously described. Each time the starboard solenoid is energized, the relay C opens its contacts C2 and closes its contacts C1. This completes an energizing circuit for the capacitor C13 from the battery 7 through the contacts A1, which are now closed, through the resistor R9 and the contacts C1 and D2, now closed, to the capacitor C13 and the negative side of battery 2. The capacitor C13 now charges at a rate depending upon the ohmic value of the resistor R9. This charging rate is such as a to prevent breakdown due to normal operation of either of the port or starboard solenoids. When the starboard solenoid is deenergized, the relay C2 drops out and its contacts C2 close, completing a discharge circuit for the capacitor C13 which includes the resistor R10 and the contacts C2 and D2 both of which are now closed. In the next instant, the auxiliary rudder relay transfers the energizing connection to the port solenoid, and the relay D paralleling this solenoid is energized, closing its contacts D1. At this time, the capacitor C13 is charged through the circuit including the resistor R9 but in this instance including the contacts D1 through the capacitor to the negative side of the battery 2. Thus with each operation of the port and starboard solenoids, the capacitor C13 is charged, and in the instant of time in which the auxiliary rudder relay is transferring the energizing connection for the port and starboard solenoids, the capacitor C13 is discharged through the normally closed contacts C2 and D2 of the relays C and D. By proper selection of the time constants of the capacitor charging circuits, it is possible to provide for substantially an infinite number of normal operations of the port and standard solenoids before a breakdown voltage across the capacitor C13 is accumulated, yet at the same time affording a sufficient rapid rate of charging so that breakdown of the tube may obtain at any point on the cycle should the application of the port or starboard solenoid persist beyond a given period of time. Thus if one of the relays controlling energization of the solenoids PS and SS should fail and maintain port or starboard rudder beyond a given interval of time determined by the charging rate of capacitor C13, the capacitor voltage triggers the control tube 1CT which then completes the circuits for stopping the torpedo.

The mechanics of the timer 2T are such that any setting thereof below a minimum distance, say 500 yards, prevents operation of the timing mechanism by the drive through the centrifugal clutch from the propulsion motor. For this reason, the relay A remains in its deenergized position and in conjunction with firing of the tube 1CT completes the energizing circuit for the relay C which opens its contacts E1 to drop out the auxiliary start relay and at the same time closes its contacts E2 to provide a holding circuit therefor which is independent of the position of the contact A. As a result, the motor switch is deenergized and the torpedo stops. Similarly, the electrical control is so constructed that enabling settings at ranges less than 500 yards are not obtainable. This is accomplished by the provision of a stop on the panel for dial 22 of the electrical follow-up control, which stop is so placed that the potentiometer operated by dial 22 introduces a bridge unbalance into the system corresponding to a 500 yard setting on the variable enabler.

Assuming now that the enabler has been set for a distance beyond the assumed 500 yard minimum, the function thereof will be in a normal manner to close the contacts 2T2 which may be set for 410 yards and then to close the contacts 2T1 which energize the auxiliary enabler relay AEN, in turn, bringing in the enabler relay EN and initiating the control for transfer to acoustic steering. Under these conditions, the capacitor C13 will have been charging at a normal charging rate depending upon the function of the port and starboard solenoids and, at the time of energization of relay A which opens the contacts A1, will not have built up a sufficient charging voltage to cause breakdown of the control tube 1CT. The anti-circular run control is, therefore, disabled and the torpedo proceeds under the influence of the gyroscope and depth control until the intended sound field becomes sufficiently strong to effect complete switchover to acoustic steering.

In general, to keep the torpedo from ever returning to the craft, it is necessary to restrict the maximum turn to 180° or less. For an electrical control gyroscope using 180° arcuate contact segments in the gyro compass relay, the same limit is imposed by the fact that in a circling run due to a mechanically jammed rudder the solenoids are energized alternately for 180° of turn. On the other hand, in order to allow angle shots, the largest gyro angle to be permitted will determine the time constant of the resistor capacitor charging and discharging circuits.

*War shot torpedo*

Figures 3, 3A:
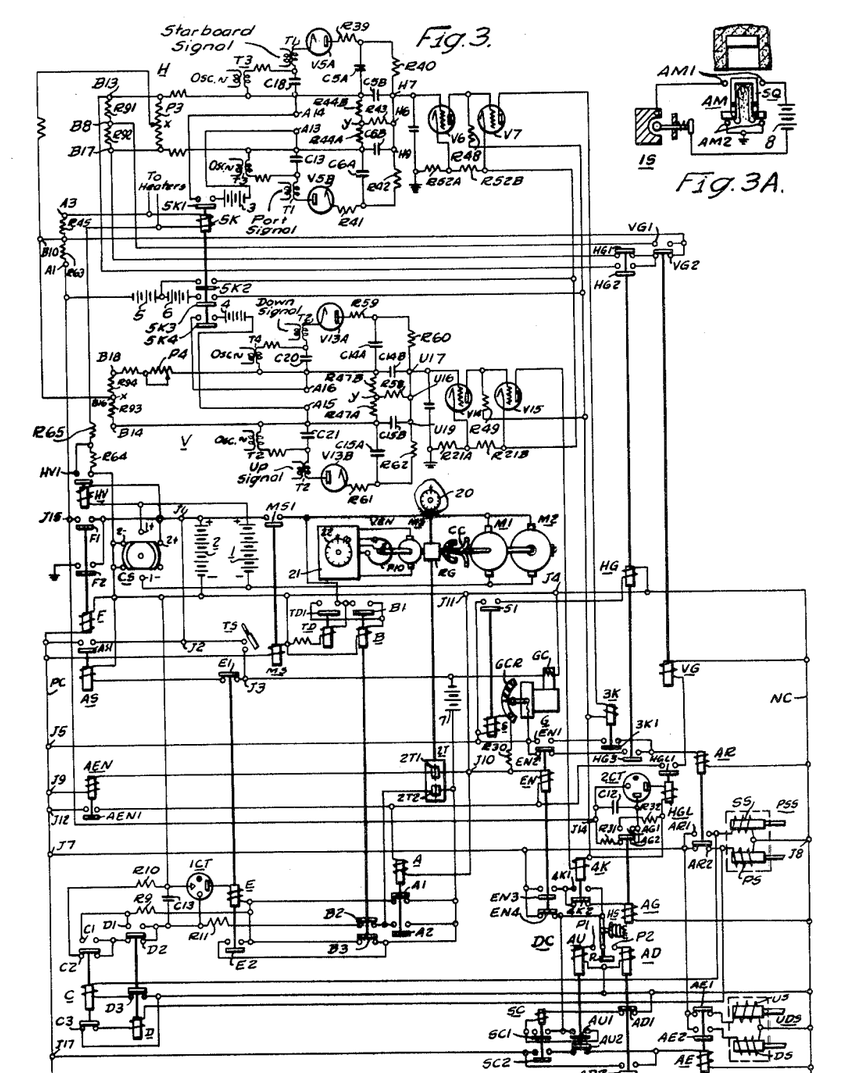
FIG. 3 is a warshot version of the control system of FIG. 2, including the present invention in the same form.
FIG. 3a is a schematic showing of an arming circuit employed in conjunction with the circuit of FIG. 3.

The schematic diagram for the war shot torpedo is shown in FIG. 3. The war shot torpedo, unlike the exercise shot, is not intended to be recovered. Hence, it is connected or built for but a single shot. For this reason, all of the control elements of the exercise or test torpedo which provide for the recovery thereof may be eliminated from the war shot circuits. Such circuit elements include the depth cutout, the broach cutout, the timer 1T, the stop relay and the carbon dioxide flask which exhausts the liquid ballast, the torpex loaded war head being substituted for the ballast chamber in the war shot torpedo.

The motor switch is now energized in a circuit from the positive conductor PC directly to the coil of the motor switch and the negative side of battery 2. The auxiliary start relay AS is now energized in a circuit including only the contacts E1 of the relay E and the trigger switch contacts. Previously this circuit contained the contacts 1T1 of the timer 1T, the purpose of that element being to stop the torpedo after a predetermined length of exercise run. The remaining system elements and their function in the complete control system is similar to that in the exercise shot torpedo. Hence, the function of the war shot torpedo with the exceptions noted will be understood from the description made in connection with the preceding figures of the drawing.

*Arming mechanism*

An additional element is utilized in the war shot scheme and that is the arming mechanism of FIG. 3a which provides for the detonation of the torpex war head of the war shot torpedo. Details of this arming mechanism may be had upon reference to the copending application of Walter E. Lewis, Serial No. 662,948, filed April 18, 1946, entitled Timing Mechanism, now Patent No. 2,682,223, and assigned to the same assignee as this application. This circuit is comprised of an inertia switch IS which is connected in series with the contacts AM1 of the arming mechanism AM and the battery 8. The arming mechanism comprises a squib SQ which in its normal position straddles a set of contacts AM2, each side of which is at ground potential. A wire filament is connected in the squib to the electrically insulated points of this squib which straddle the mentioned contacts. This wire filament is buried in a highly sensitive powder charge which is ignited when the wire filament is charged with electricity and heated. The squib is carried in a suitable mechanism (not shown) which is driven, for example, from a suitable water wheel operated when the torpedo moves through the water so that the squib assembly is moved upward, as viewed, to bridge the contacts AM1 connecting the wire filament across these contacts and in series with the battery circuit. This movement of the squib assembly also moves the squib into intimate relationship with the booster charge forming part of a powder train employed to detonate the war head of the torpedo. When the torpedo strikes its target, the inertia switch IS closes, due to the high rate of deceleration, and the wire filament is connected in the battery circuit, igniting the war head.

The foregoing disclosure and the showings made in the drawings are merely illustrative of the principles of this invention as embodied in a particular torpedo and are not to be interpreted in a limiting sense. Obviously many modifications and variations of the present invention are possible in the light of the above teachings. It is therefore to be understood that within the scope of the appended claims the invention may be practiced otherwise than as specifically described.

We claim as our invention:

1. In a torpedo of the type having an electric propulsion motor and a pair of battery sections adapted to be selectively connected in series or in parallel with the motor, whereby the motor may be operated at different speeds, the magnitudes of the voltages across said battery sections having different values dependent upon whether the motor and battery sections are connected in parallel or in series, and an electrical system energized by one of said battery sections, the improvements in combination comprising means for maintaining the current energizing said electrical system substantially the same when the battery sections are connected in series as when the battery sections are connected in parallel.

2. In a torpedo having an electric propulsion motor and electronic control gear employing tubes having a series-connected heater circuit, in combination, a battery having at least two major sections, one said battery section connected to supply current to said heater circuit through a current-limiting resistor, selective motor-speed switching means and associated control circuits adapted to connect said battery sections and motor in series and to short out said current-limiting resistor, or to connect said battery sections and motor in parallel and to unshort said current-limiting resistor, said resistor being adapted to limit the heater circuit current during said parallel connection of said battery sections to a value substantially equal to that provided during said series connection of said battery sections.

3. In a torpedo having an electric propulsion motor and electronic control gear employing tubes having a series-connected heater circuit, in combination, an electrical power source having at least two major sections, one said section connected to supply current to said heater circuit through a current-limiting resistor, selective motor-speed switching means and associated control circuits adapted to connect said power source sections and motor in series and to short out said current-limiting resistor, or to connect said power source sections and motor in parallel and to unshort said current-limiting resistor, said resistor being adapted to limit the heater circuit current during said parallel connection of said power source sections to a value substantially equal to that provided during said series connection of said power source sections.

References Cited by the Examiner

UNITED STATES PATENTS

| | | | |
|---|---|---|---|
| 913,283 | 2/1909 | Gruenfeldt | 318—412 X |
| 971,199 | 9/1910 | Janisch | 318—412 X |
| 1,155,164 | 9/1915 | Riley | 318—412 X |
| 1,189,947 | 7/1916 | Henderson | 318—412 X |
| 1,324,194 | 12/1919 | Harries | 318—412 X |
| 1,378,291 | 5/1921 | Sperry | 114—20 |
| 1,527,508 | 2/1925 | Dieter | 114—20 |
| 2,382,058 | 8/1945 | Hull | 114—23 |
| 2,414,928 | 1/1947 | Chilton | 114—20 |
| 2,417,767 | 3/1947 | Leonard | 114—20 |

FOREIGN PATENTS 409,574   5/1934   Great Britain.

BENJAMIN A. BORCHELT, *Primary Examiner.*

JAMES L. BREWRINK, NORMAN H. EVANS, FRED C. MATTERN, Jr., *Examiners.*